United States Patent [19]

Barefoot

[11] Patent Number: 4,626,300

[45] Date of Patent: Dec. 2, 1986

[54] METHOD AND APPARATUS FOR VULCANIZING RETREADED TIRES

[75] Inventor: Carlton K. Barefoot, Muncie, Ind.

[73] Assignee: Tred-X Corporation, Muncie, Ind.

[21] Appl. No.: 656,332

[22] Filed: Oct. 1, 1984

[51] Int. Cl.[4] .................. B29D 30/56; B29C 33/40
[52] U.S. Cl. .................. 156/96; 156/394.1; 425/17
[58] Field of Search ............ 156/95, 96, 129, 130.3, 156/127, 130.5, 130.7, 394.1, 909; 425/14, 17, 22; 264/36

[56] References Cited

U.S. PATENT DOCUMENTS

| 3,689,337 | 9/1972 | Schelkmann | 156/95 |
| 3,745,084 | 7/1973 | Schelkmann | 156/96 |
| 3,815,651 | 6/1974 | Neal | 152/187 |
| 3,883,382 | 5/1975 | Pelletier | 156/96 |
| 3,920,498 | 11/1975 | Everhardt et al. | 425/17 |
| 3,935,042 | 1/1976 | Wolfe | 156/96 |
| 3,976,532 | 8/1976 | Barefoot | 156/405 |
| 4,088,521 | 5/1978 | Neal | 156/96 |
| 4,105,482 | 8/1978 | Wapelhorst et al. | 156/96 |
| 4,274,897 | 6/1981 | Barefoot | 156/96 |

FOREIGN PATENT DOCUMENTS 2717571 11/1977 Fed. Rep. of Germany ........ 156/96

Primary Examiner—Michael Ball
Assistant Examiner—Ramon R. Hoch
Attorney, Agent, or Firm—Beaman & Beaman

[57] ABSTRACT

The invention pertains to the method and apparatus for vulcanizing retreaded tires wherein an annular precured tread is bonded to a tire carcass by bonding material interposed between the tread and carcass. Grills are attached to the opposite sides of the carcass and each are associated with an annular elastomeric ironing member having a concave surface corresponding to the tire side configuration engaging the tread marginal edges whereby the ironing surface shapes and smooths the transition zone between the tread and tire carcass resulting in improved appearance and integral bonding.

6 Claims, 7 Drawing Figures

METHOD AND APPARATUS FOR VULCANIZING RETREADED TIRES

BACKGROUND OF THE INVENTION

An improved method and apparatus for retreading or recapping worn tire carcasses is shown in the assignee's U.S. Pat. No. 4,274,897. This patent discusses many of the difficulties attendant with prior retreading systems, and the disclosed method and apparatus for retreading tires overcomes many of the past problems. In the aforementioned patent an envelope is used to encompass the tread and tire carcass sides, and the envelope is sealed to the tire sides by grills wherein the envelope is sealed to the tire during vulcanization.

While the use of the envelope locates the envelope adjacent the tread marginal edges wherein the uncured bonding material between the tread and carcass is exposed such that the envelope aids in shaping the transition zone between the tread and tire side, the flexibility of the envelope, and the lack of firm substantial shaping surfaces at the transition zone, often results in bubbles, smears, and other nonuniform deviations which detract from the appearance of the finished product.

Further, use of the envelope during pressurization and heating within the vulcanization chamber does not permit the pressures imposed upon the tread to be uniform, especially within the grooves of the tread configuration, and a uniform bonding and vulcanization pressure is difficult to achieve. Further, the need to assemble the envelope to the tread and tire carcass prior to vulcanizing complicates the vulcanizing process adding costs, and considerable skill is required by the operator to correctly correlate the envelope with the grills which seal the envelope to the tire carcass sides.

It is an object of the invention to provide a method and apparatus for retreading tires with a molded tread where a layer of bonding material is interposed between the tread and prepared tire carcass wherein the transition zone between the tread and tire side uniformly blends into the tire side for improved bonding and aesthetic purposes.

Another object of the invention is to provide a method for retreading tires utilizing a bonding material between a tread and the tire carcass wherein the marginal edges of the tread and the bonding material, are, alone, confined during vulcanization of the tread to the tire.

A further object of the invention is to provide apparatus for use during the retreading of tires engaging the marginal edge of the tread and the tire side during vulcanization to iron and shape the transition region to improve the appearance and mechanical properties thereof.

An additional object of the invention is to provide tire retreading apparatus adapted to engage the transition region between a tire carcass side and the tread marginal edge during vulcanization for shaping the marginal region, and wherein the iron used for such shaping is adjustably mounted upon a substantially rigid support permitting self-alignment of the iron to the tire side.

A further object of the invention is to provide a method and apparatus for vulcanizing a tread upon a tire carass by means of a bonding material which does not require inflation or internal support of the tire carcass, nor requires an envelope surrounding the tread and engaging the tire sides.

Yet another object of the invention is to provide apparatus for retreading tires which does not require encasement of the tread within an envelope nor inflation or support of the tire carcass, and wherein equal external pressures are applied to the tread during pressurization within the vulcanizing chamber.

In the practice of the invention a precured profiled tread of annular configuration is placed upon a prepared tire carcass with uncured bonding material interposed therebetween. The marginal edges of the tread and bonding material lie upon the tire side and are externally accessible and visible.

A pair of grills are each associated with an annular iron and are mounted upon opposite sides of the tire assembly and pulled toward each other by bridging springs.

The iron is preferably formed of an elastomeric material and is associated with circular wire rings concentric to the tire carcass axis. The iron includes an ironing surface of a concave configuration substantially corresponding to the tire side configuration and the iron is preferably associated with the wire rings in a loose manner wherein the iron and iron surface may slightly move relative to the ring and closely align itself with the tire side contour.

The iron and ironing surface are of sufficient mass, and radial dimension, as to overlie the transition region between the tire tread and the tire carcasses, including the bonding material therebetween, and as the grill ring supports the elastomer iron throughout its form, the ironing surface will be uniformly and closely held against the tire side and tread marginal edge.

Upon placing the assembled tire carcass, tread and grills within a vulcanization chamber such as an autoclave, the soft bonding material, due to the heat, will be shaped by the ironing surface, as is the tread marginal edge, and a smooth blending of the tread edge, bonding material and tire carcass side occurs "under" the ironing surface whereupon, upon removal of the grill and iron from the tire side, an attractive retreading appearance is achieved, and the ironing surface improves the mechanical features of the transition region by minimizing bubbles, loose or unvulcanized edges, and the like.

The configuration of the grills is such that a plurality of tire and grill assemblies may be stacked within a conventional autoclave to permit a plurality of tires to be simulaneously vulcanized reducing the time and expense of retreading.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
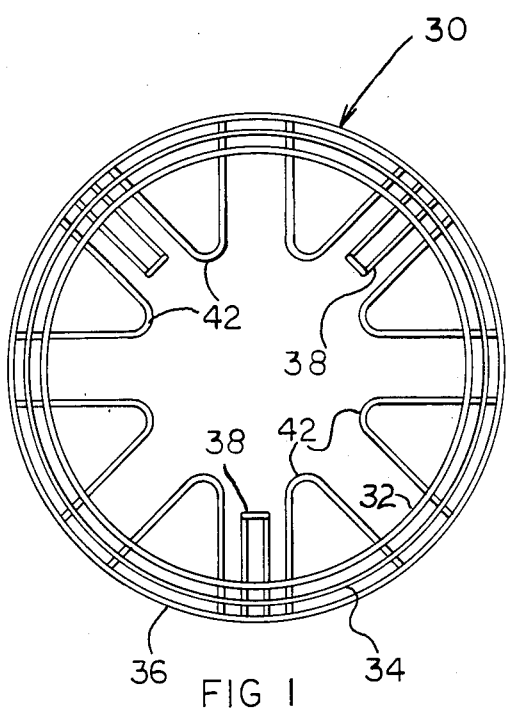
FIG. 1 is an elevational view of the inside surface of a retread transition region forming grill in accord with the invention.
Figure 2:
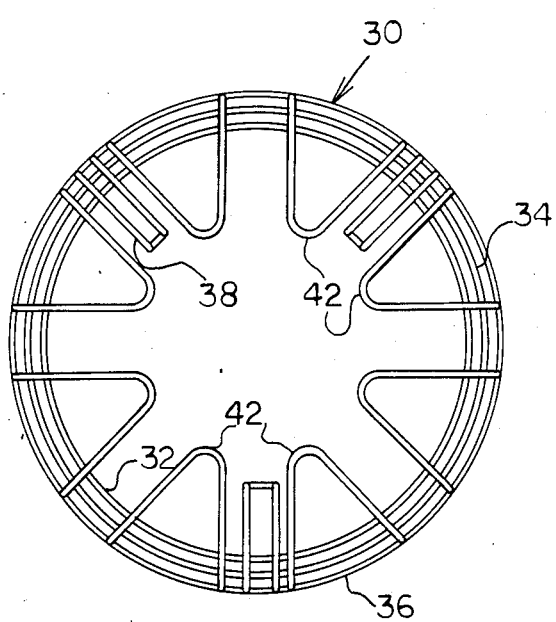
FIG. 2 is an elevational view of the opposite side of the grill as shown in FIG. 1.
Figure 3:
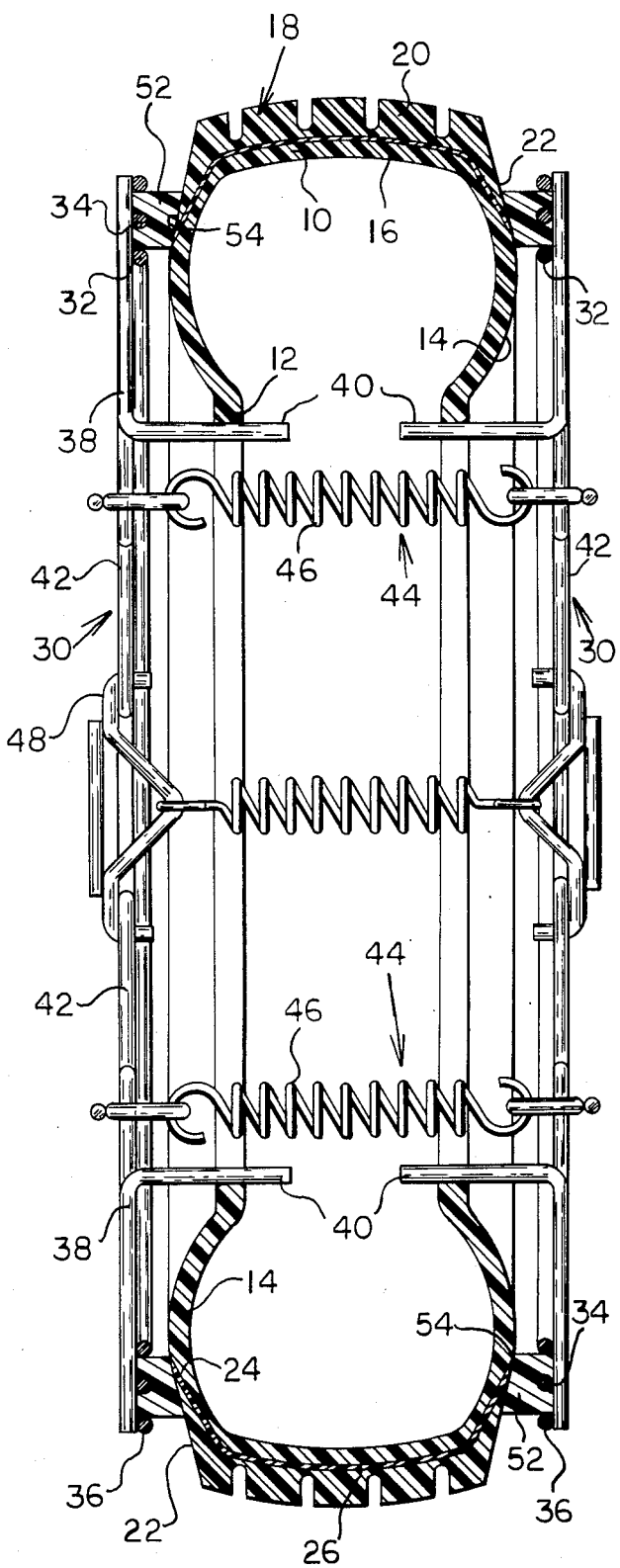
FIG. 3 is a diametrical, elevational, sectional view of an assembled tire carcass and tread having a pair of grills with irons mounted thereon.
Figure 4:
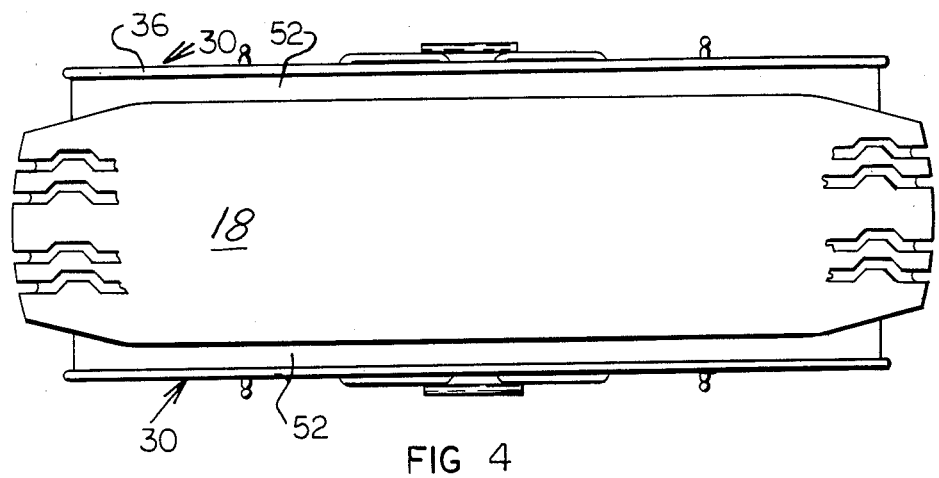
FIG. 4 is a side, elevational view of the assembly of FIG. 3.

As will be appreciated from FIG. 3, a retreaded tire in accord with the concepts of the invention includes a tire carcass 10 having beads 12, sides 14, and a circumference 16 from which the old tread has been removed and the surface has been buffed and roughened to improve the bonding and vulcanization of the new tread thereto. The tread 18 to be vulcanized to the tire carcass 10, is preferably of a continuous annular configuration having a tread portion 20, and shoulder wings 22 terminating in marginal edges 24. A bonding material strip 26, such as of cushion gum, is interposed between the tread 18 and tire carcass 10 having edges 28 which may extend outwardly slightly beyond the tread marginal edges 24.

The assembly of the tread 18 to the tire 10 may utilize the assignee's apparatus as shown in U.S. Pat. Nos. 3,976,532 and 4,088,521, and the relationship between the tread, cushion gum bonding material and tire carcass is similar to that shown in the assignee's U.S. Pat. No. 3,815,651.

In the practice of the invention a pair of grills 30 are located upon each side of the assembled tire carcass, tread and bonding material assembly prior to vulcanization. The grills 30 are identical in construction and are preferably formed of wire, and include three concentric wire rings 32, 34 and 36. Positioning fingers 38 are welded to the rings, and include inwardly extending portions 40 which extend into the tire opening, and engage the bead 12, as will be appreciated from FIG. 3. In this manner, the fingers 38 concentrically position a grill 30 adjacent a tire side 14.

Figure 5:
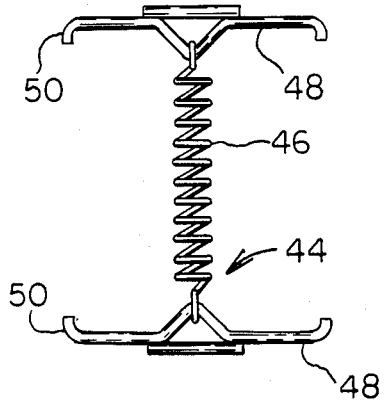
FIG. 5 is an elevational view of the spring bridge, per se, employed to interconnect the ironing grills.

Each grill 30 also includes a plurality of V-shaped spring anchors 42 welded to the rings 32-36, extending inwardly The anchors 42 permit the spring bridge 44, FIG. 5, to be attached to each grill mounted on a tire carcass pulling the grills toward each other and maintaining the grills against the tire sides.

As will be appreciated from FIG. 5, the spring bridges 44 include an extension spring 46 associated at each end with a wire wing 48 having downwardly depending portions 50 which are received between adjacent anchors 42. The length of the springs 46 is such that the springs are extended when interposed between the grills assembled upon a tire maintaining the grills biased against the tire sides 14.

On its inner side, each grill is provided with an annular iron 52 adjacent rings 32-36. The irons 52 are preferably formed of an elastomeric material of relatively soft constituency, such as formed of cured rubber or the like, and each iron includes an inner concave ironing surface 54 of a form substantially corresponding to the configuration of the adjacent tire side 14. The position of the iron and ironing surface, and the radial dimension of the ironing surface 54, at least one half inch, are such that the ironing surface engages and overlaps the marginal edge 24 of the tread 18, the bonding strip and edges 28, and a portion of the tire side, i.e. the transition zone between the tire carcass and the tread wings 22. Preferably, the ironing surface 54, is of a smooth configuration.

In the embodiment of FIGS. 1-4, the elastomer iron 52 is mounted on the middle wire ring 34 intermediate rings 32 and 36 in a manner as to be slightly rotatable thereto, i.e. the elastomer is somewhat loosely mounted upon the ring 34. This loose mounting permits the elastomer to "pivot" to a limited degree relative to the ring permitting the ironing surface 54 to align itself with the engaged tread marginal edge 24 and tire side 14. This mounting of the iron assures the best possible relationship of the ironing surface 54 to the tread and tire side, resulting in accurate blending of the bonding material during vulcanization.

Figure 7:
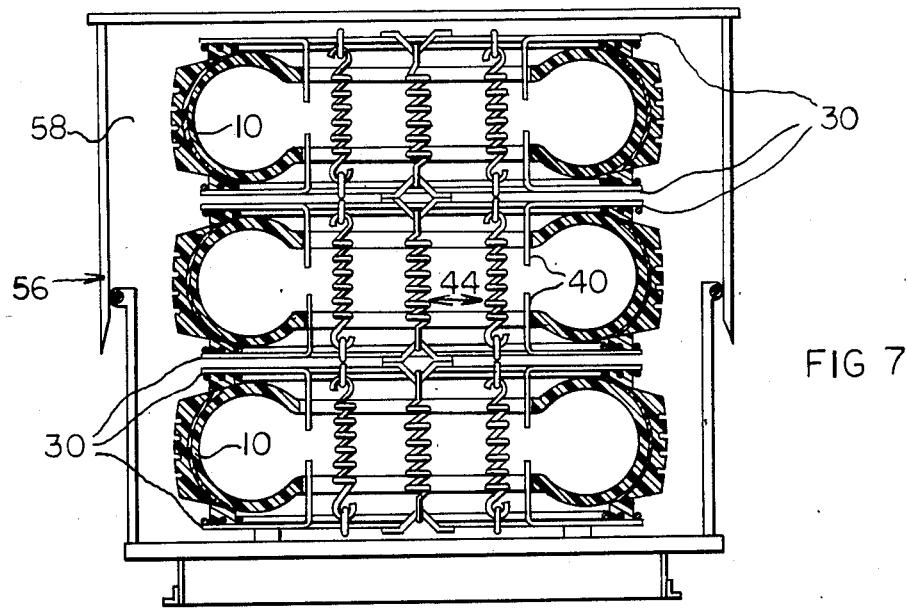
FIG. 7 is an elevational, sectional view of an autoclave showing a plurality of tire assemblies located therein.

After the tire carcass, tread, bonding material and grills are assembled together as in FIG. 3, the assembly is ready for vulcanization and is placed within a standard vulcanizing chamber or autoclave 56 used for retreading of tires. FIG. 7 illustrates such an example wherein three tire assemblies are "stacked".

The introduction of steam into the chamber 58 pressurizing the chamber and the steam, in addition to providing the necessary vulcanization temperature, imposes pressure upon the tread 18 in view of the absence of air between the tread and the tire carcass. In that no envelope circumscribes the tread, the pressurized atmosphere within the vulcanization chamber will equally distribute itself over the entire tread configuration assuring a uniform bonding and vulcanizing process resulting in a superior retread assembly.

After vulcanization has been completed, the tire assemblies are removed from the chamber 58, and after sufficient cooling, the spring bridges 44 are removed from the grills and the grills removed from the associated tires. The material of the bonding strip 26, which was softened during vulcanization, has now distributed itself evenly throughout the transition zone between the tread marginal edges 24 and the tire side 14, and as the ironing surface 54 has functioned as a mold to confine and shape the bonding material, a smooth attractive appearance is achieved at this transition zone due to the presence of the iron and ironing surface. The ironing surface assures that no blisters, bumps, humps or depressions exists as to detract from the aesthetic appearance of the tire, and the ironing surface also improves the mechanical aspects of the vulcanization by minimizing blistering and the presence of voids adjacent the junction between the tread and tire carcass.

As no deleterious effect has been imposed upon the grills during vulcanization, the grills may be immediately used again, and the process repeated with a new tread and tire carcass.

The quality of the transition zone shaped by the ironing surface 54 is so high as to eliminate the need for buffing, trimming or otherwise performing secondary operations on the retreaded tire, as is often the case, and the practice of the invention reduces costs, minimizes the time required for tire retreading, eliminates the use and cost of an envelope, and produces superior aesthetic and mechanical bonding qualities.

Figure 6:
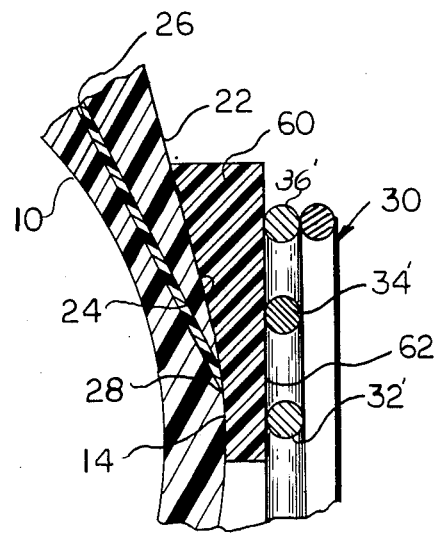
FIG. 6 is an enlarged, detail, sectional view of another embodiment of grill iron engaging the transition region between the tread and tire side.

A modification in the association between the transition zone iron and the grills is shown in FIG. 6. In this embodiment, the grills are identical to those previously described, and identical components are identified by primed reference numerals.

In the embodiment of FIG. 6, the elastomer iron 60 comprises a free annular ring having an outer flat radial surface 62 and an inner convex ironing surface 64 for engaging the tire carcass and tread transition zone. Rather than the iron being molded to the ring 34', or the ring 34' being received within a recess in the iron, as in the previously described embodiment, the rings 32'-36' merely engage the iron surface 62 for forcing the iron into engagement with the tire side and tread. In this embodiment, the elastomer material of the iron, and the limited flexibility of the grill, does permit a limited "self-aligning" of the iron to the tread and tire side, and this embodiment will produce results as well as those of the previously described embodiment. However, installation is a little more difficult as the irons must be handled as separate components.

While the irons 52 and 60 have been described as being formed of elastomeric material, it is to be understood that it is possible within the scope of the invention to form the irons of metal or other rigid material. The basic purpose of the irons is to confine the bonding material during vulcanization, and maintain the marginal edges of the tread and bonding material adjacent the tire side so as to blend these edges into the tire side, and it is appreciated that various modifications to the inventive concepts may be apparent to those skilled in the art without departing from the spirit and scope of the invention.

I claim:

1. The method of retreading a tire with a pre-cured, pre-molded annular full circle tread wherein an uncured layer of bonding material having marginal edges is located between a tire having sides and a pre-cured, pre-molded annular full circle tread mounted upon the tire having marginal edges overlying portions of the tire sides in an autoclave comprising the steps of:
   (a) confining only the marginal edges of the tread and bonding material and the tire sides adjacent the tread and bonding material marginal edges with an elastomeric material having an ironing surface of a configuration blending with the tire sides on both sides of the tire such that the ironing surface wil be uniformly and closely held against the entire configuration of the tread marginal edges,
   (b) placing the tire and tread assembly in an autoclave,
   (c) heating the assembly in the autoclave in a pressurized environment to vulcanize the tread to the tire and confining and shaping the tread and bonding material at the tread and bonding material marginal edges to produce a blended transition at the tread marginal edges and tire sides,
   (d) removing the tire and tread assembly from the autoclave, and
   (e) releasing the confinement of the marginal edges of the tread and bonding material.

2. Apparatus for vulcanizing an annular full circle tire tread having a periphery and marginal edges to a tire carcass having a central opening and sides within an autoclave comprising, in combination, first and second grills each having an outer periphery, an annular circular iron of elastomeric material having a circular ironing surface mounted on each of said grills adjacent the peripheries thereof, said ironing surfaces having a normal configuration substantially corresponding to the configuration of the tire tread marginal edges and the side of a tire carcass, and mounting means extending between said grills for detachably mounting said grills upon the opposite sides of the tire carcass with the ironing surface of the iron of each grill pressing and engaging and overlying the adjacent tread marginal edge and tire carcass side whereby said ironing surfaces smooth and shape the tread marginal edges to the associated tire carcass side during vulcanizing of the tread to the tire carcass and the tread periphery is fully exposed to the autoclave environment during vulcanization.

3. A grill for temporary engagement with the side of a tire to be retreaded with an annular full circle tire tread having marginal edges within an autoclave comprising, in combination, a framework having a center and a circumference, a circular metal ring defined upon said framework concentric to said center, a circular elastomeric band supported on said metal ring concentric to said center, a circular ironing surface face defined on said band concentric to said center having a normal configuration substantially corresponding to the configuration of the tire side and the tire tread marginal edges, and mounting means defined on said framework for mounting said framework upon a tire.

4. In a grill as in claim 3, said ironing surface face being of a concave configuration substantially corresponding to the configuration of the side of a tire and having a radial dimension of at least one-half inch.

5. The method of retreading a tire with a pre-cured, pre-molded annular full circle tread wherein an uncured layer of bonding material having marginal edges is located between a tire having sides and a pre-cured, pre-molded annular full circle tread mounted upon the tire having marginal edges overlying portions of the tire sides in an autoclave comprising the steps of:
   (a) engaging and confining only the marginal edges of the tread and bonding material and the tire sides adjacent the tread and bonding material marginal edges with an elastomeric material having an ironing surfaces of a configuration blending with the tire sides on both sides of the tire,
   (b) uniformly and closely holding the ironing surface against the entire configuration of the tread marginal edges,
   (c) automatically self-aligning the ironing surface with the engaged marginal edges of the tread and the tire sides adjacent the tread by the engagement of the ironing surface therewith,
   (d) placing the tire and tread assembly in an autoclave,
   (e) heating the assembly in the autoclave in a pressurized environment to vulcanize the tread to the tire and confining and shaping the tread and bonding material at the tread and bonding material marginal edges to produce a blended transition at the tread marginal edges and tire sides,
   (f) removing the tire and tread assembly from the autoclave, and
   (g) releasing the confinement of the marginal edges of the tread and bonding material.

6. The method of retreading a tire with a pre-cured, pre-molded annular full circle tread wherein an uncured layer of bonding material having marginal edges is located between a tire having sides and a pre-cured, pre-molded annular full circle tread mounted upon the tire having marginal edges overlying portions of the tire sides in an autoclave comprising the steps of:
   (a) engaging and confining only the marginal edges of the tread and bonding material and the tire sides adjacent the tread and bonding material marginal edge with an elastomeric material having an ironing surface having a configuration blending with the tire sides on both sides of the tire, (b) uniformly and clearly holding the ironing surface against the entire configuration of the tread marginal edges, (c) automatically self-aligning the elastomeric ironing surface with the engaged marginal edges of the tread and the tire sides adjacent the tread by the engagement of the ironing surface therewith, (d) placing the tire and tread assembly in an autoclave, (e) heating the assembly in the autoclave in a pressurized environment to vulcanize the tread to the tire and confining and shaping the tread and bonding material at the tread and bonding material marginal edges to produce a blended transition at the tread marginal edges and tire sides, (f) removing the tire and tread assembly from the autoclave, and (g) releasing the confinement of the marginal edges of the tread and bonding material.

* * * * *